July 25, 1961   C. H. VAN HARTESVELDT   2,993,232
PRE-FORM FABRICATING APPARATUS
Filed Jan. 2, 1957
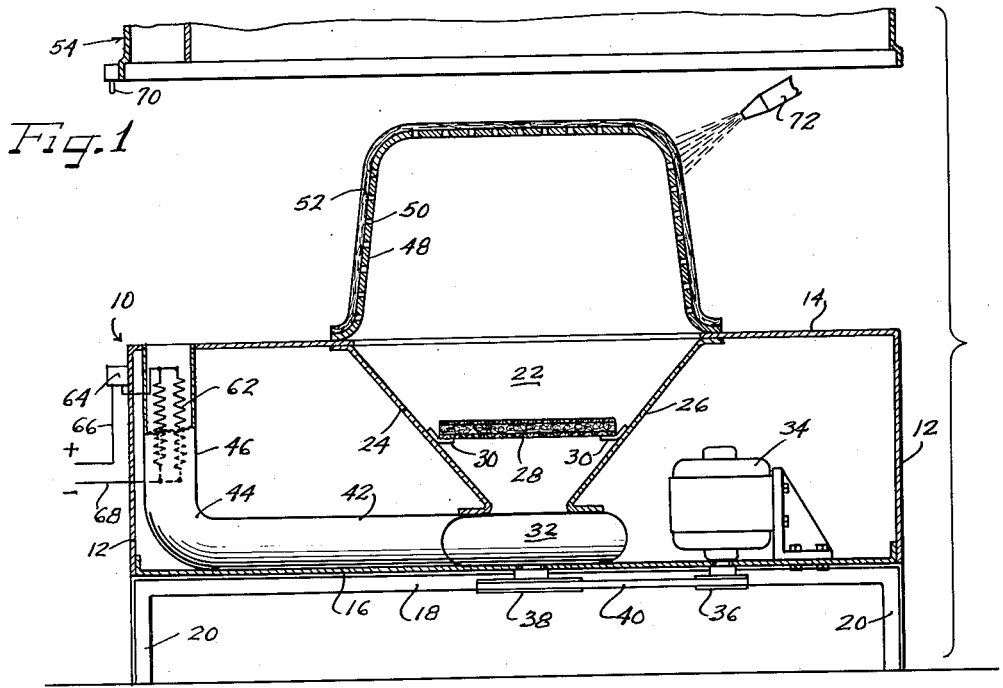
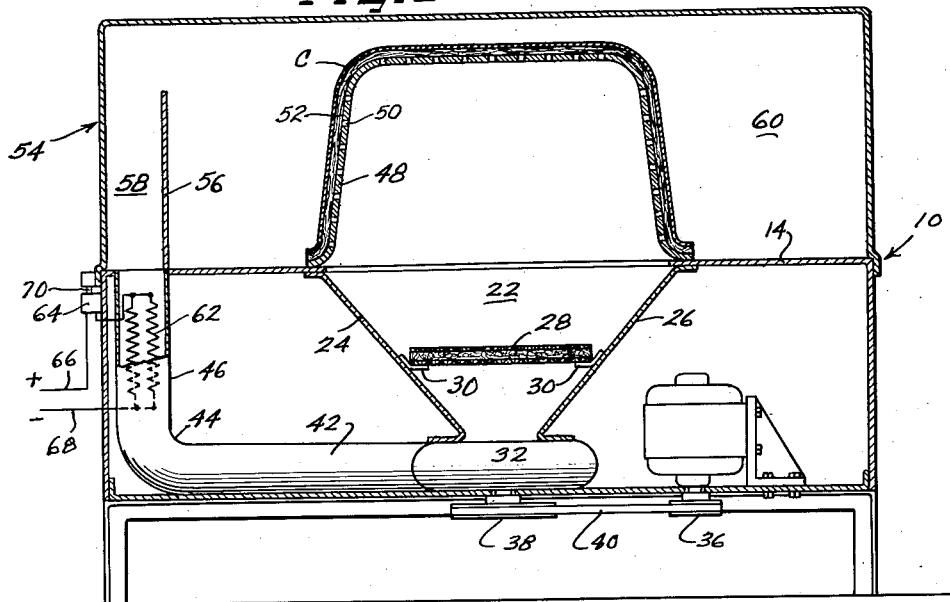
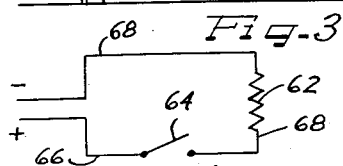
Inventor
CARROLL H. VAN HARTESVELDT

United States Patent Office 2,993,232
Patented July 25, 1961

2,993,232
PRE-FORM FABRICATING APPARATUS
Carroll H. Van Hartesveldt, 510 Golf View Blvd.,
Birmingham, Mich.
Filed Jan. 2, 1957, Ser. No. 632,227
2 Claims. (Cl. 18—19)

This application relates to apparatus and method for fabricating pre-forms and more particularly to apparatus and method for fabricating pre-forms of sheet material such as fiberglass or the like in which sheets of fiberglass are arranged on a positive mold and retained in position by air drawn through openings in the mold.

Heretofore, difficulty has been experienced in fabricating pre-forms of relatively large size from discrete fibers due to the fact that accurate distribution of fibers is difficult when performed either manually or mechanically. The fibers of these pre-forms were conventionally sprayed with a resinous coating which required curing in order to render the pre-form properly self-sustaining. It will be appreciated that a pre-form of this type may not be removed from the mold until the coating is set, or else the desired shape will be lost. Consequently, a multiplicity of large forms are required for baking in batch or continuous ovens or a large furnace must be removably located over the pre-form mold.

Accordingly, a principal object of the invention is to provide apparatus for fabricating pre-forms of the stated type wherein curing of the resinous coating may be effected in a relatively short time.

A further object of the invention is to provide apparatus of the mentioned type in which air drawn to the mold to retain the pre-form in position is then heated and directed against the preform to effect curing.

Another object of the invention is to provide apparatus of the type described wherein air drawn to the mold to retain the pre-form in position is directed upwardly and wherein an enclosure is mounted above the mold so that it may envelop the mold after spraying has been effected to provide an enclosed chamber in which the air drawn to the mold is discharged for curing of the coating.

A further object of the invention is to provide apparatus for fabricating formed articles from sheet material in which one or more layers of sheet material is shaped to conform to configuration of a positive mold and a blower is utilized for creating a suction within said mold to retain the sheet material in position wherein the air discharged from the blower is heated and wherein means are provided which is selectively operable to direct the heated air into contact with the coating.

Another object of the invention is to provide fabricating apparatus of the stated type having a perforated positive mold, a blower for creating a suction within the mold to retain sheet material on the outer surface thereof so that the sheet material may be provided with a plastic coating in its assumed shape, and means for curing the coating while the sheet material is on the mold, said means comprising an enclosure for surrounding the mold and an electrical resistance unit energizable upon movement of the enclosure to enveloping position to heat the air discharged from the blower, and means for directing the heated air into contact with the plastic coating.

Other objects, features and advantages of the present invention will be more fully apparent from the following detailed description taken in connection with the accompanying drawings, in which:

FIGURE 1 is a vertical sectional view of a pre-formed fabricating apparatus made in accordance with the present invention and showing the enclosure in the position it assumes while the pre-form is sprayed;

FIGURE 2 is a view similar to FIGURE 1 but showing the enclosure in its lower position; and FIGURE 3 is a schematic diagram of an electrical circuit that may be employed for controlling the operation of the electric resistance unit of the apparatus of FIGURES 1 and 2.

Referring now to the drawings, and more particularly to FIGURE 1, the pre-form fabricating apparatus of the present invention includes a housing 10 having side walls 12, a top wall 14, and a bottom wall 16 which is shown as resting on a frame 18 having legs 20. A suction chamber 22 defined by walls 24 and 26 is arranged within the housing 10. A filter element 28 is disposed within the chamber 22 and may be secured in position by any suitable means such as brackets 30. Communicating with the chamber 22 is a centrigual air pump or blower 32 which may be driven by an electric motor 34 through the medium of pulleys 36 and 38, and a drive belt 40. At the discharge end of the pump 32 is a duct 42 which is bent at 44 to form an upwardly extending section 46. By this arrangement, air drawn from the chamber 22 by the blower or pump 32 is discharged upwardly through the passage formed by the duct 42. A mold 48, of the positive type, is arranged in superimposed relation above the chamber 22 and is provided with a plurality of apertures 50 on its side and top walls. Sheet material, such as fiberglass bats or the like, may be arranged on the outer surface of the mold 48, and may be fitted as required to form a laminate, indicated by reference numeral 52. The sheet material is retained in position by the suction of the blower 32, the interior of the mold 48 being in communication with the chamber 22. Stray fibers, lint or the like, that may be drawn through the openings 50 are trapped in the filter unit 28.

According to the present invention, means are provided for completely enclosing the mold and pre-form after the several plies have been sprayed with the conventional resinous coating which may take the form of a polyester binder. To this end, an enclosure or hood 54 is mounted above the housing 10 and is movable from the position shown in FIGURE 1 to the position shown in FIGURE 2, in which position the enclosure 54 completely envelopes the mold and pre-form. Any suitable means, such as a chain fall or the like, may be provided for raising the enclosure 54 to the position shown in FIGURE 1 after curing of the pre-form has been effected. In addition, suitable guide means (not shown) may be employed to assure vertical movement of the enclosure.

According to an important feature of the present invention, air drawn through the openings 50 in the mold 48 by the pump or blower 32 is discharged upwardly through a passage defined by the duct 42. The enclosure 54 is provided with a wall 56 defining a passage 58 which in the lower position of the enclosure 54 is in register with the passage defined by the duct 42. By this arrangement, air discharged by the upright portion 46 of the duct 42 is discharged directly into the passage 58 for uniform distribution throughout a chamber 60 formed by the enclosure 54, the top wall 14 of the housing 10, and the mold 48. According to the present invention also, means are provided for heating the air discharged by the air pump or blower 32 during the course of its passage into the chamber 60. To this end, an electrical resistance element 62 is disposed in the upright portion 46 of the duct 42 and is selectively energizable by the movement of the enclosure 54 to the position shown in FIGURE 2. A switch 64 is mounted on one of the side walls 12 adjacent its upper marginal edge. The switch 64 is connected to a suitable source of current by conductors 66 and 68. Disposed in the line 68 is the electrical resistance unit 62. The switch 64 is operative to selectively energize the resistance unit 62 when the enclosure 54 is moved to the position shown in FIGURE 2. For this purpose, an actuator bar 70 is carried by the enclosure 54 for actuation of the switch 64 when the enclosure 54 reaches the position shown in FIGURE 2. The actuator bar 70 may be suitably insulated from the enclosure 54 and serves as a conductive path for closing the switch 64, shown diagrammatically in FIGURE 3, for energization of the electrical resistance element 62.

In carrying out the present method, the mold 48 is placed in inverted position above the chamber 22 while the enclosure 54 is in its raised position. In the present instance, the mold illustrated is suitable for fabricating pre-forms of light weight bath tubs of the type used in mobile homes and the like. A bat forming a ply of the laminate 52 is carefully fitted over the mold 48 so as to cover completely all of the openings 50. The bat is retained in position by air drawn through the openings 50 by the air pump or blower 32 which is actuated by the motor 34. When the bat is in proper position, its outer surface is then sprayed with a resinous coating by means of a conventional spray gun 72 shown fragmentarily in FIGURE 1. After completion of the spraying step one or more additional bats are placed over the form and each is sprayed to obtain a multi-ply laminate in which the several plies are effectively bonded each to the other. The enclosure 54 is then lowered so that the air is discharged from the duct 42 into the passage 58 and thence into the chamber 60 and into contact with the resinous coating on the bat 52. As the enclosure 54 is brought into the position shown in FIGURE 2, the switch 64 is actuated for energization of the electrical heating element 62 so that the air passing through the duct 42 is heated for proper curing of the resinous coating. After a relatively short period of time, the coating C (shown in exaggerated thickness) is cured, the enclosure 54 is raised to afford access to the pre-form, and the pre-form may be removed as a self-sustaining article.

It will be understood that modifications and variations may be effected without departing from the scope of the novel concepts of the present invention.

I claim as my invention:

1. Apparatus for fabricating formed articles from resin-coated fibrous sheet material comprising a perforated positive mold for reception of sheet material shaped to conform to the configuration of the mold, a blower for creating a suction within said mold to cause the sheet material to adhere thereto, so that the free surfaces of the sheet material may be provided with a resinous binder, filter means interposed between said mold and said blower, means for curing said binder while the material is on the mold, said means including an upwardly extending duct for receiving air discharged from said blower, electrical resistance means within said duct for heating the air passing therethrough, a vertically movable hood adapted to envelop said mold and having a duct in register with said first duct to form a continuous passage for heated air, said passage being adapted to direct the heated air into contact with the binder to cure the same so that the sheet material retains the shape of the mold, and a switch for selectively energizing said electrical resistance means, said switch being actuatable upon movement of said hood to enveloping position.

2. Apparatus for fabricating formed articles from resin-coated fibrous sheet material comprising a housing, a perforated positive mold sealingly mounted on said housing for reception of sheet material shaped to conform to the configuration of the mold, a blower mounted in said housing for creating a suction within said mold to cause the sheet material to adhere thereto so that the free surfaces of the sheet material may be provided with a resinous binder, filter means interposed between said mold and said blower to trap loose fibers, means for curing the binder while the sheet material is on the mold, said means including an upwardly extending duct for discharging air from said blower, electrical resistance means within said duct for heating the air passing therethrough, a hood mounted in superimposed relation to said housing and movable vertically downwardly from an inoperative position to an operative position in which the mold is enveloped and a curing chamber is formed, said hood having a duct in register with said first-named duct to form a continuous passage for the heated air to flow into said curing chamber and into contact with said mold so that the binder is cured and the shape of the mold retained, and means operative in response to movement of said hood for selectively energizing said electrical resistance means, said last-named means including an actuator bar carried by said hood and a switch disposed in the path of travel of said actuator bar whereby the electrical resistance means is energized upon movement of said hood to operative position.

References Cited in the file of this patent

UNITED STATES PATENTS

| 1,866,617 | Tompkins | July 26, 1932 |
| 2,592,470 | Ryberg | Apr. 8, 1952 |
| 2,615,201 | Cloud | Oct. 28, 1952 |
| 2,686,552 | Faeber et al. | Aug. 17, 1954 |
| 2,698,271 | Clark | Dec. 28, 1954 |
| 2,702,261 | Bacon et al. | Feb. 15, 1955 |
| 2,744,044 | Toulmin | May 1, 1956 |
| 2,777,170 | Marindin | Jan. 15, 1957 |

FOREIGN PATENTS

| 161,843 | Australia | Mar. 10, 1955 |